April 24, 1962 W. R. BROWN ET AL 3,030,976
FEED VALVE FOR ICE CREAM MACHINE
Filed Oct. 20, 1959
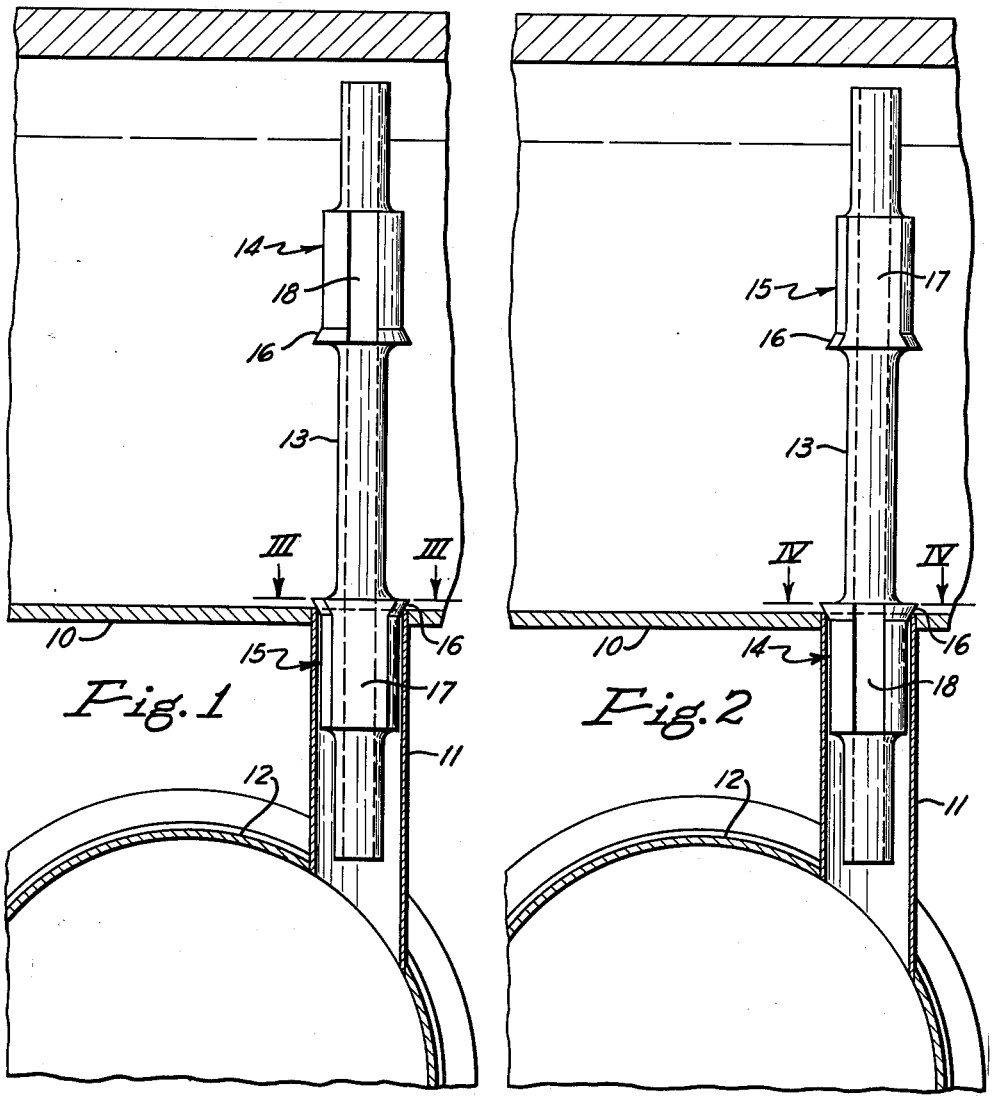
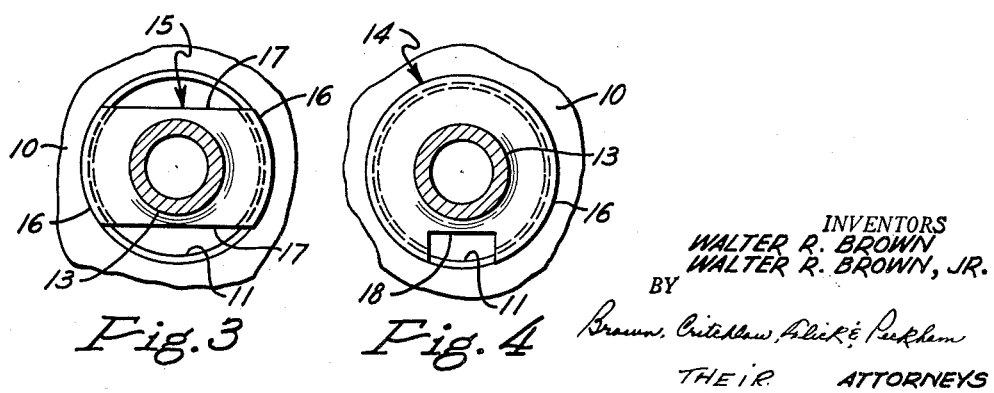
INVENTORS
WALTER R. BROWN
WALTER R. BROWN, JR.
BY
Brown, Critchlow, Flick & Peckham
THEIR ATTORNEYS

United States Patent Office 3,030,976
Patented Apr. 24, 1962

3,030,976
FEED VALVE FOR ICE CREAM MACHINE
Walter R. Brown, Pittsburgh, and Walter R. Brown, Jr., Glenshaw, Pa., assignors to The Brown Manufacturing Company, Inc., a corporation of Pennsylvania
Filed Oct. 20, 1959, Ser. No. 847,543
6 Claims. (Cl. 137—270)

This invention relates to a feed valve for metering the flow of air and mix to the freezing cylinder of an automatic ice cream freezer.

A principal object of the invention is to produce a feed valve which is of a simple unitary construction, which can readily be removed from the machine for sterilization and which can just as readily be re-assembled in working position.

A further object is the provision of a feed valve which does not require washers or other parts subject to wear and replacement.

In carrying out the invention a simple tube is provided which extends from a point above the level of mix in the mix reservoir to a point within the supply line which carries mix from the mix reservoir to the freezing cylinder. The exterior of this tube is provided at each end of the tube with a control head, either of which may serve to meter the flow of mix to the freezing cylinder. By providing a fluid port of different size on the two control heads, it is possible to provide a different proportion of mix to air by merely reversing the ends of the feed valve.

These, and other objects and advantages of the invention will become apparent as the description proceeds.

In the drawings:

FIG. 1 is a vertical section through a portion of an ice cream freezer showing the feed valve in elevation.

FIG. 2 is a view similar to FIG. 1 but showing the opposite end of the feed valve in control position.

FIG. 3 is a section on line III—III of FIG. 1.

FIG. 4 is a section on line IV—IV of FIG. 2.

Referring to the drawings in greater detail, the reservoir 10 holds the liquid material, commonly known as the "mix" which is to be beaten up with air and frozen into ice cream. A supply line 11 extends from an exit port in the bottom of the mix reservoir to the freezing cylinder 12.

The feed valve comprises a tubular stem 13 carrying a control head 14 near one end, and the control head 15 near the other end. Either of these heads may be used to control the exit of mix from the mix reservoir, but in FIG. 1 the head 15 is in control positon.

It will be clear from FIGS. 1 and 3 that the body of the control head 15 is larger than the normal diameter of the tubular stem 13, and carries a beveled flange 16 which forms a sealing engagement with the exit port.

Each of the heads 14 and 15 is formed with a passage which permits mix to flow past the control head. These passages may be of any preferred shape. As illustrated, the control head 15 has flattened portions 17 on its opposite sides, and these flattened portions form the flow passage for this head.

The flow passsage in the head 14 is formed by milling a slot 18 in one side of the head. In the form illustrated the single slot 18 in head 14 has a smaller flow capacity than the flow passage formed by the two flattened portions 17 of the head 15.

It will be understood that when the feed valve is in the position illustrated in FIGS. 1 and 3, the upper end of the stem 13 extends above the level of mix in the reservoir, so that the air to be incorporated in the ice cream flows down through the bore in the stem. Simultaneously, mix flows down through the passage formed by the flattened portions 17 of head 15, to provide a constant proportion of mix to the amount of air supplied.

If it is desired to provide a lesser volume of mix for the amount of air supplied, it is easy, when setting up the machine for a run, to reverse the feed valve end-for-end, placing the head 14 in the opening in the supply line 11, as shown in FIGS. 2 and 4. In this position the feed valve will supply a smaller amount of mix relative to the volume of air, because the passage past head 14 is smaller than the passage past head 15.

Preferably the tube 13 and heads 14 and 15 are all formed of stainless steel, and the heads are welded to the tube, thus forming a single, unitary structure which is easy to remove and sterilize.

It should be understood that the passages which provide for flow of mix past the valve heads may vary in shape from those illustrated, and may be formed in any convenient manner.

The introduction of proper quantities of air and of mix into a freezer cylinder is of great importance in the continued automatic operation of such machines. Too much air an too little mix will cause a "starved" condition in the cylinder, will reduce production, and inflate the product with higher air content or "over-run." Too little air and too much mix will permit the cylinder to "flood" or fill with mix, and will produce a prolonged operating time, only partially frozen product, insufficient air inclusion (over-run), and unsatisfactory operation. By having available one or more of these feed valves with varied mix passage sizes on the respective heads, the correct valve opening may be selected corresponding to the thickness or viscosity of the mix used, and the desired amount of over-run, and the speed of use or service. Thicker mix demands a larger passage, thinner mix a smaller passage. Slow serving indicates a narrow mix passage, fast serving a larger opening.

The valve of the present invention provides a simple and efficient means for meeting these varied requirements. It is a one-piece construction and is therefore easy to remove for cleaning and sterilization, and there are no separate pieces to misplace. Once the proper control head has been placed in operating position nothing can go wrong.

It is possible to supply the operator with valves having mix passages of different sizes to meet any requirements he may have.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A feed valve for ice cream machines of the type having a mix reservoir, a freezing cylinder, and a supply line extending from an exit port in the bottom of the mix reservoir to the freezing cylinder, the improvement which comprises:
    a tubular stem of a length sufficient to extend from a point above the normal level of mix in the mix reservoir to a point within the exit port;
    the tubular stem carrying near each end a control head formed to seat against the exit port;
    the two control heads facing in opposite directions;
    each control head being formed with a passage which permits mix to flow past the control head and into the freezing cylinder when the control head is seated against the exit port.

2. A feed valve as claimed in claim 1 in which the control passage in one control head is larger than the control passage in the other control head.

3. A feed valve as claimed in claim 1 in which the tubular stem and the control heads are formed of stainless steel and are welded together to form a unitary structure.

4. A feed valve for ice cream machines of the type having a mix reservoir, a freezing cylinder, and a supply line extending from an exit port in the bottom of the mix reservoir to the freezing cylinder, the improvement which comprises:
- a tubular stem of a length sufficient to extend from a point above the normal level of mix in the mix reservoir to a point within the exit port;
- the tubular stem carrying near each end a control head which is of larger diameter than the tubular stem;
- each control head having a beveled flange constructed and arranged to engage the exit port;
- the two beveled flanges facing in opposite directions;
- each control head being formed with a passage in the beveled flange which permits mix to flow past the beveled flange and into the freezing cylinder.

5. A feed valve as claimed in claim 4 in which the control passage in one control head is larger than the control passage in the other control head.

6. A feed valve as claimed in claim 4 in which the tubular stem and the control heads are formed of stainless steel and are welded together to form a unitary structure.

References Cited in the file of this patent
UNITED STATES PATENTS

| | | |
|---|---|---|
| 2,523,853 | Woodruff | Sept. 26, 1950 |
| 2,737,024 | Swenson | Mar. 6, 1956 |
| 2,924,952 | Swenson | Feb. 16, 1960 |